United States Patent Office 3,485,153
Patented Dec. 23, 1969

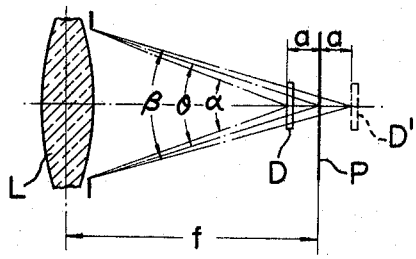
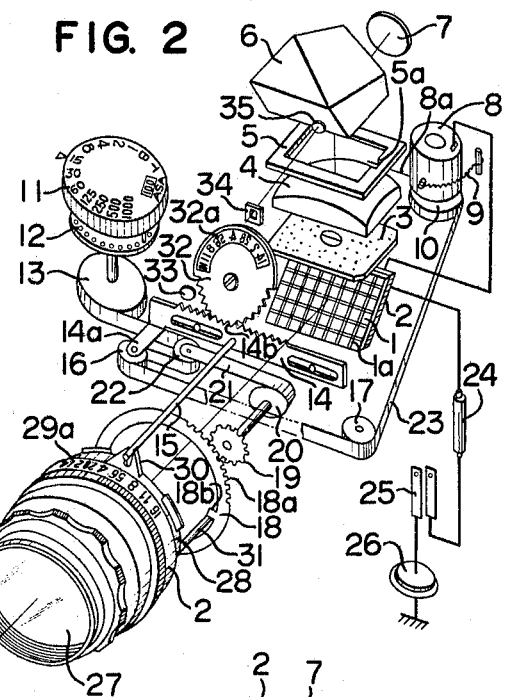
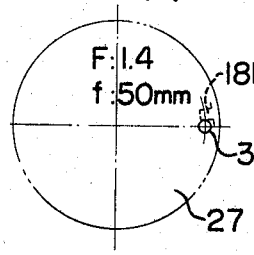
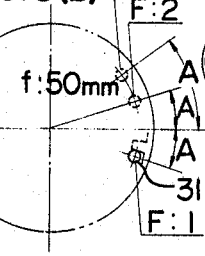
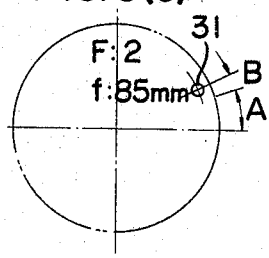
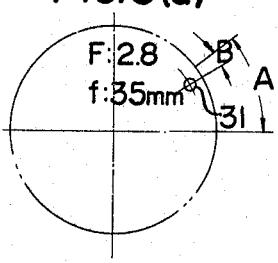
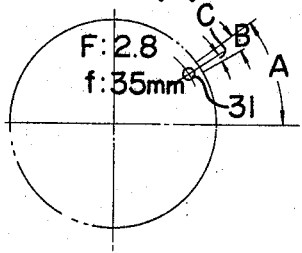
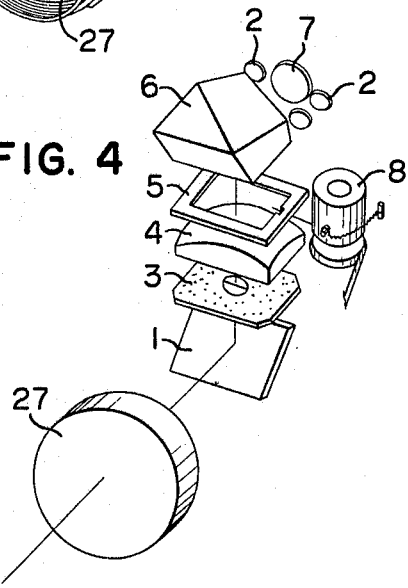

3,485,153
EXPOSURE METER CORRECTION MEANS FOR A SINGLE LENS REFLEX CAMERA HAVING INTERCHANGEABLE LENSES
Shigeo Ono and Jun Shimomura, Tokyo, Japan, assignors to Nippon Kogaku K.K., Tokyo, Japan, a corporation of Japan
Filed Feb. 7, 1966, Ser. No. 525,603
Claims priority, application Japan, Feb. 13, 1965, 40/8,089
Int. Cl. G01j 1/00, 1/52
U.S. Cl. 95—10          9 Claims

ABSTRACT OF THE DISCLOSURE

An exposure meter correction arrangement is provided for a single lens reflex camera having interchangeable lenses, photometric measurements being made through the lenses. Each of the lenses is provided with a signal member or index member angularly positioned in accordance with the maximum aperture ratio of the particular lens, the signal member being coupled to a correcting member of the exposure meter circuit when the lens is mounted on the camera body. The correcting member positioned by the signal member provides the required adjustments in the exposure meter circuit in accordance with the difference in the aperture ratios of the interchangeable lenses.

---

The present invention relates to an improvement of the exposure meter for detecting the appropriate exposure of the object to be photographed by measuring the amount of light rays passing through the camera lens of a lens exchangeable type camera.

The generally known factors for measuring the exposure of the object are shutter time value, photo-sensitivity of film, stopping value and filter factor. In case of a camera with interchangeable lenses, the quantity of light rays passing through the different lenses being different qualitatively, and therefore it is difficult to obtain high precision of light measurement by means of the conventional devices.

The present invention, by overcoming the said drawbacks, provides an exposure-meter for obtaining a high precision of light measurement when the different lenses are employed.

The following are the specific characteristics of the lens exchangeable type.

When interchangeable lenses are provided for a single reflex camera, at least the following five factors constitute specific problems by respectively correlating with each other.

(1) Structure of exposure meter
   (I) Calculating system
   (II) Position of the light rays receiving portion
(2) Characteristics and structure of exchange lens
   (III) Focal length
   (IV) Maximum relative aperture
   (V) Automatic pre-set stop Considering factor I, the calculating system of an exposure meter circuit takes into consideration certain specific values as exposure time, film speed, filter factor and the like to provide a standard indication. Deviations from such values and other variables such as the aperture ratio of the lens, the position of the light receiving surface of the photocell, and the like, necessitate a proportioning of the standard indication to provide a corrected indication according to such variables. One problem in providing a corrected through-the-lens photometric system, is the focal lengths of the interchangeable lenses in relationship to the location of the light sensitive surface of the photocell.

As shown in FIG. 1, in case the light rays receiving portion D or D' of the exposure-meter is provided at a distance $a$ in front of or in back of the focusing plane P of the lens L, the opening angle against the aperture of the lens is in the relation of $\alpha > \theta > \beta$. The brightness at the light rays receiving surface D or D', and the brightness at the focusing plane P are different, the difference being determined by the distance $a$ related to the focal length $f$ of the lens. In the case of the fixed lens type camera wherein the focal length $f$ is constant the problem can be easily solved by correcting the difference beforehand with exposure measurement, but in case of interchangeable lenses having various focal lengths, the values of $a/f$ are varied, and therefore unless the adjustment is carried out on each lens it is impossible to obtain the right light-measurement value.

Next, in case of an interchangeable lens having automatic preset diaphragm there is a problem in relation with the maximum aperture ratio. Because at the time of the light measurement, the diaphragm is opened, and quantity of light rays corresponding to the maximum aperture ratio of the mounted lens is incident upon the light rays receiving portion. In other words, there is no problem when the aperture ratios of interchangeable lenses of various types are the same, but there is a difference between lenses in regard to the aperture ratio. In case the same subject scene is measured, the obtained value is different because the quantities of in-coming light rays are different. For example, the light-measurement value obtained by measuring light rays by using a lens having an aperture ratio of 1:2, and the value obtained by using another lens having an aperture ratio of 1:1.4 or 1:2.8 would require a stop difference to be calculated into the exposure value. Unless this correction is carried out for each lens, it is impossible to correctly measure the quantity of light rays.

Again, there is a problem of aperture masking in case of the exposure-meter of such a type as to measure the average illumination of the whole picture (object) or such a type as to measure the illumination of the view by placing the light rays receiving portion of the exposure-meter in the neighbourhood of the field. In other words, even if the aperture ratio and focal length are the same, the aperture masking is varied by such design considerations as the structure of lens, stopping position, the form of lens barrel, and the limitation in the correction of aberration, and therefore the difference comes out in incidence luminous flux at the point of photo-measurement, which results in the measurement error, and therefore, in case of the above mentioned type, the errors incurred by aperture masking must also be corrected.

However, as to the correction of focal length, it is restricted, as a principle, only to the case where the light receiving portion of the exposure meter is provided in front of the focusing plane, but in case it is so devised that the incident light rays are directly irradiated onto the light rays receiving portion by making a part or the whole of the focusing plane transparent, it is necessary to carry out the correction even if the light rays receiving portion is provided behind the focusing plane.

Also, as shown in FIG. 4, in case of such a camera whose focusing plane is in a mat form, and in the exposure-meter of such a type as to measure the brightness of the said focusing plane, instead of the fact that it is not necessary to correct the focal length, it is necessary to correct the degree of dispersion of the said mat surface, the degree of dispersion being varied in accordance with the characteristics of lens.

The present invention provides an exposure meter arrangement whereby correct light-measurements are made through interchangeable lenses in which provisions are made to compensate for the various factors discussed.

According to the present invention, there is provided an exposure meter arrangement for measuring the amount of light passing through the interchangeable lenses of a camera, wherein two or more of the various exposure meter correction factors brought about by interchangeable lens operation are combined to provide a combined signal or index value for the signal or index member on the lens and interlocking the index member automatically to the exposure meter in the lens mounting operation.

The present invention will now be described in detail with reference to the drawings showing an embodiment of the present invention in which:

FIG. 1 is a diagram illustrative of the principle of the correction of the focal length in accordance with the present invention;

FIG. 2 shows an illustrative embodiment of the exposure measuring device of the present invention;

FIG. 3a through 3e show an embodiment of the correction system according to the present invention, where the positions of pin are shown when respective lenses are mounted on camera; and FIG. 4 is an optical array of the case when the light receiving surface of the photocell is provided behind the focusing screen.

Referring now in detail to the drawing, only those portions of a single lens reflex camera are illustrated for an understanding of the present invention, it will be understood that the invention is directed to a built-in exposure meter whereby through-the-lens photometric measurements are made, the camera being provided with a complement of interchangeable lenses. The camera is provided with the usual viewing mirror 1, the reflecting surface of which is formed with lattice-like slits 1a. Secured to the back of the mirror 1 is a photoconductive cell 2. A focusing screen 3 is interposed between the mirror and a condenser lens 4. Secured by suitable means above the lens 4 is a field stop 5 provided at one side thereof with a notch 5a, for purposes hereinafter appearing. Completing the optical arrangement within the camera body is a penta-dach prism 6 and a viewfinder eyepiece 7 through which the scene to be photographed is viewed.

Rotatably mounted within the camera body is a galvanometer 8 biased by a spring 9 to rotate in a counter-clockwise direction. The galvanometer is provided with a needle 8a, the extreme end of which appears in the notch 5a of the field stop. The galvanometer is adapted to be rotated in a clockwise direction when the current therethrough increases. A disc or pulley 10 is provided on the galvanometer and is adapted to be rotated therewith.

For setting the shutter speed of the camera, a shutter dial 11 is provided having in conjunction therewith a film speed plate 12 which is positionable relatively to the dial 11 by means of a ratchet or similar arrangement. Rotatable with the plate 12 is a disc or pulley 12, the pulley 12 and the pulley 10 being interconnected by a ribbon 23, which will be more fully described.

Slideably mounted within the camera body is a slide member 14 having secured therein at approximately its center a connecting pin 15 forming the interconnection between the lenses and the mechanism as will hereinafter appear. The slide member 14 is provided with an extension 14a forming the support for a pulley or roller 16. The slide member is formed with rack teeth 14b for purposes hereinafter appearing.

Rotatably mounted on the camera body, as on the lens mount (not shown) is a correction ring 18 formed with a gear sector 18a on its outer periphery and a radially extending projection 18b on its inner periphery. Meshing with the gear sector 18a is an interlocking gear 19 which is integrally rotatable with a correction disc or pulley 20. The disc 20 is secured to one end of a short ribbon 21, the other end of the ribbon being secured to a correction roller 22 in a manner known in the art. The interlocking ribbon 23 previously mentioned as secured at its ends to the pulleys 10 and 13 passes around the discs or pulleys 17, 16 and 22.

Suitably mounted within the camera is a resistance 24 connected through a switch 25 to a battery 26; the other end of the resistance being connected through the photoconductive cell 2 to the galvanometer 8 to complete the exposure circuit.

Illustrated in FIG. 2 is an interchangeable objective 27 having an automatic pre-set iris diaphragm mechanism and provided with a bayonet mounting 28 and a stop-setting ring 29 having thereon a stop scale 29a. The divisions of the stop scale are chosen to be compatible with those of the other lenses. Secured to the stop setting ring is a signal or index member 30 in the form of a fork to receive the interlocking pin 15 secured in the slide member 14 in the camera. The index member 30 is positioned relative to the stop ring scale in the same place which is common to the other lenses. Projecting rearwardly from the bayonet mounting of the lens 27 is a correction pin 31 which is adapted to engage with the internal projection 18b of the correction ring 18. The circumferential position of the pin 31 is determined in accordance with the different lenses forming the set of interchangeable lenses.

In other words, the exposure-meter is to be designed with a specific lens as a reference (for example, 1:1.4, $f$:50 mm.), and therefore, in case the other exchange lens is mounted, the difference between the other lens and the reference lens must be corrected. For example, in case of the lenses whose focal lengths are equal, it is sufficient to correct only for the difference in aperture ratio, and therefore as shown in FIG. 3b, it is sufficient only to slide the position of the pin 31 beforehand by the amount A to be corrected in the respective directions from the position of the pin of the reference lens (FIG. 3a).

Also, in the case of the lens (1:2, $f$:85 mm.), it is necessary to carry out the correction A of the aperture ratio and the correction B of focal length, and therefore first the two corrections are calculated and the position of the pin 31 is moved by the composite amount of correction $(A+B)$ as shown in FIG. 3c. In case $f$ of the lens to be mounted is longer than $f$ of the reference lens, the brightness of the light rays receiving surface becomes less than the reference value and the direction of correction of focal length in this case becomes the same as the direction of the aperture ratio correction.

In case of lens (1:2.8, $f$:85 mm.), the direction of aperture ratio correction A and that of focal length correction B are opposite, and therefore the amount of composite correction thereof becomes $A-B$ as shown in FIG. 3d.

Furthermore, the difference of aperture masking generally comes out between lenses, it is necessary to correct the difference C of the aperture masking of the lens from that of the reference lens. An example thereof is given in FIG. 3e, and as shown in the example, the aperture masking of a wide angle lens is greater than that of the reference lens, and becomes darker than the reference value, and therefore the amount of the composite correction becomes $A-B+C$.

Also, in case the light rays receiving portion of the exposure meter is placed at the rear of the focusing surface, and the said focusing surface is in the form of a mat, the correction of the degree of diffusion of each lens is carried out in a similar manner to the aforementioned method for the correction of the difference against the reference value. In other words, when various kinds of correction signals accompanying lens-exchange are combined and imparted to the common correction pin 31, at the time when a lens is mounted, it is possible to carry out the correction automatically in relation with the said mounting operation.

The form of transmitting the correction signals is not limited to operation in the direction of periphery alone, but it can be a straight line operation in the axial direction.

Thus, since respective correction signals are combined in the position of the pin 31, the pin 31 rotates the correction ring 18 to change the position of the correction roller 22, and, by means of the interlocking ribbon 23, rotates the whole of the meter 8 by an angle equal to the angle of deflection of the pointer 8a of the meter 8 due to the difference of lenses to again match the same with the indicator notch 5a. Thereafter the shutter time value, film sensitivity, and stopping value are combined in accordance with the conventional method, and an appropriate exposure can be obtained.

The stop value of the lens as set may be read through the eyepiece 7 by means of an indicator disc 32 having a sector gear meshing with the gear rack 14b of the slide member 14 and bearing stop indicia 32a. An optical system comprising a lens 32, a field stop 34 and a lens 35 cemented to the penta-dach prism 5 transmits the image of the stop indicia 32a to the eyepiece.

As stated above, according to the present invention, it is possible to carry out various kinds of exposure meter corrections which accompany lens interchange in relation with the lens mounting operation automatically and correctly, and therefore it is possible to conduct precise measurement of light rays, which is accounted as an advantage of the present invention.

Also, in case stop value reading mechanism is added thereto, in spite of the said corrections, the correct stop value can be read within a finder, which is also accounted as another advantage of the present invention.

What is claimed is:

1. A single lens reflex camera comprising in combination, an interchangeable objective having a variable diaphragm, a photosensitive element responsive to the light through the maximum aperture of the objective,
    signal means fixed to the objective to provide a signal of at least the maximum aperture ratio of the objective,
    means for controlling the exposure in response to the photosensitive element including correcting means, and
    means interlocking the signal means with the correcting means when the objective is mounted on the camera to compensate for the differences in response of the photosensitive element due to at least the differences between the maximum aperture ratios of interchangeable objectives.

2. A single lens reflex camera according to claim 1, wherein the exposure controlling means includes a light meter responsive to the photosensitive element, a pointer for the light meter visible through the camera viewfinder, and means for determining the exposure in accordance with the position of the pointer.

3. A single lens reflex camera according to claim 1, wherein the exposure controlling means includes a light meter responsive to the photosensitive element, a pointer for the light meter visible through the camera viewfinder,
    a diaphragm control means for presetting the stop of the objective coupled to the meter by said interlocking means,
    shutter control means, and
    a differential mechanism for connecting the diaphragm control means, the shutter control means and the correcting means to the light meter.

4. A camera according to claim 3, wherein said signal means is a projection whose position is in accordance at least with the maximum aperture ratio of the objective.

5. A camera according to claim 3, further comprising a stop indicator, visible in the view finder, interconnected with said diaphragm control means.

6. A single lens reflex camera according to claim 1, wherein the correcting means includes a slide member movable by the objective signal means,
    a shutter setting dial for the camera,
    a first pulley rotatable with the shutter setting dial,
    a second pulley movable with the slide member,
    a galvanometer responsive to the light incident on the photosensitive element,
    a third pulley rotatable with the galvanometer, and
    a ribbon connected to the first and third pulleys and passing over the second pulley to provide the compensation for the differences in response of the photosensitive element caused by the differences between the aperture ratios of the objectives.

7. A single lens reflex camera according to claim 6 wherein a correction ring is rotatably mounted on the camera,
    a correction pin on the objective and cooperating with the correction ring when the objective is mounted on the camera, the position of the correction pin being determined by the aperture ratio, focal length and aperture masking of the objective mounted on the camera body relative to an objective used as a standard,
    and a correction roller positioned by the correction ring, said correction roller cooperating with said ribbon and pulleys to compensate for the differences in the interchangeable lenses.

8. A single lens reflex camera according to claim 6, wherein a film speed dial is provided for the shutter setting dial, said film speed dial being positionable relative to the shutter dial to angularly displace the first pulley relative to the shutter dial.

9. A single lens reflex camera according to claim 7, wherein a film speed dial is provided for the shutter setting dial, said film speed dial being positionable relative to the shutter dial to angularly displace the first pulley relative to the shutter dial.

References Cited

UNITED STATES PATENTS

| | | |
|---|---|---|
| 2,935,920 | 5/1960 | Rentschler _____ 95—64 XR |
| 3,018,706 | 1/1962 | Rentschler _____ 95—64 XR |
| 3,037,436 | 6/1962 | Broschke. |
| 3,071,054 | 1/1963 | Singer. |
| 3,073,222 | 1/1963 | Broschke. |
| 3,074,329 | 1/1963 | Matsuzaki. |
| 3,078,772 | 2/1963 | Goshima. |
| 3,079,848 | 3/1963 | Rentschler. |
| 3,262,380 | 7/1966 | Winkler. |

NORTON ANSHER, Primary Examiner

J. F. PETERS, JR., Assistant Examiner

U.S. Cl. X.R.

95—42, 64